US006806958B2

United States Patent
Kojima et al.

(10) Patent No.: US 6,806,958 B2
(45) Date of Patent: Oct. 19, 2004

(54) MICROFORCE MEASUREMENT METHOD AND APPARATUS

(75) Inventors: Hiroaki Kojima, Tokyo (JP); Kazuhiro Oiwa, Tokyo (JP); Brenner Bernhard, Hannover (DE)

(73) Assignee: National Institute of Information and Communications Technology, Independent Administrative Institution, Tokyo (JP)

( * ) Notice: Subject to any disclaimer, the term of this patent is extended or adjusted under 35 U.S.C. 154(b) by 155 days.

(21) Appl. No.: 10/262,067

(22) Filed: Oct. 2, 2002

(65) Prior Publication Data

US 2003/0086094 A1 May 8, 2003

(30) Foreign Application Priority Data

Oct. 4, 2001 (JP) ........................................ 2001-308744

(51) Int. Cl.[7] .............................. G01B 9/02; G01B 5/28
(52) U.S. Cl. .......................................... 356/450; 73/105
(58) Field of Search ........................ 356/450; 73/105; 250/251

(56) References Cited

U.S. PATENT DOCUMENTS 5,847,383 A * 12/1998 Tong ........................... 250/234

* cited by examiner

Primary Examiner—Frank G. Font
Assistant Examiner—Patrick Connolly
(74) Attorney, Agent, or Firm—Birch, Stewart, Kolasch & Birch, LLP

(57) ABSTRACT

A method and an apparatus for measuring the microforce acting between a micro particle fixed on the probe and the observation plane are described. The probe is feedback-controlled to be held motionless by canceling probe displacements caused by movements of the micro particle fixed on the probe, using irradiation pressure provided by a laser that applies photon pressure. The microforce acting between the micro particle fixed on the probe and the observation plane is measured by recording the time-varying laser output power. This allows probe fluctuations to be reduced to a few angstroms, and permits control of the distance to the target object to within a few nm, enabling measurement of microforces on the order of 0.1 pN.

7 Claims, 9 Drawing Sheets

MICROFORCE MEASUREMENT METHOD AND APPARATUS

TECHNICAL FIELD

This invention relates to a microforce measurement method and an apparatus for measuring time-varying physical forces related to the movements of micro particles such as protein molecules.

BACKGROUND OF THE PRESENT INVENTION

Micro glass probes and optical tweezers are known as means for measuring pN-order microforces produced in the interactions of micro particles: for example, between a motor protein molecule and protein filaments.

When a force is applied to the end of a micro glass probe perpendicular to its axis, the probe bends and exhibits a displacement of which the magnitude is proportional to the applied force. In another case, when a force is applied to a particle caught by optical tweezers, the particle exhibits a displacement of which the magnitude is proportional to the applied force. Micro glass probes and optical tweezers are thereby utilized as micro spring scales.

With a motor protein fixed on the particle caught at the end of a glass probe or optical tweezers and brought close to protein filaments fixed on the observation plane, the particle caught by the glass probe end or optical tweezers is displaced when an interaction force is exerted between the motor protein molecule and the protein filaments. Measuring this displacement makes it possible to determine the time-varying force acting between the motor protein molecule and the protein filaments (for examples, TRENDS in Biotechnology, Vol.19, No.6, June 2001, p.211–216; and Japanese Patent Application No. 09-43434).

An intermolecular force microscope has also been disclosed, for example, in Japanese Patent Application No. 07-12825. This microscope performs non-contact measurement of attractive and repulsive forces perpendicular to the observation plane, maintaining constant distance between the observation plane and the probe through feedback control of the probe position normal to the observation plane using irradiation pressure provided by a laser.

However, these conventional techniques cannot control the distance between micro particles in parallel direction to the observation plane on the order of nm, because they are not designed to reduce background noise in this plane by eliminating thermal fluctuations in the probe and particles.

Particles such as protein molecules and the like fixed on the probe move in an axis perpendicular to the probe. Because the measurement laser is emitted along a predetermined direction to provide photon pressure, if the particle moves along the same axis as laser irradiation, its movement cannot be detected.

It is, therefore, an object of the present invention to provide a microforce measurement method and an apparatus capable of measuring 0.1 pN-order forces by reducing probe fluctuations to the order of a few angstroms and controlling on the order of a few nm the distance between a micro particle fixed on the probe, such as a cell or a molecule, and the micro particles fixed on the observation plane, such as cells or molecules.

DESCRIPTION OF THE INVENTION

The microforce measurement method according to the present invention for measuring microforces acting between a micro particle fixed on a probe and an observation plane involves the following steps: keeping the probe position motionless by applying irradiation pressure to the probe with a photon pressure laser through feedback control of probe position changes caused by movement of the particle fixed on the probe; and measuring and recording the laser output power varying with time during said feedback control.

The apparatus for the above method for measuring microforces acting between a micro particle fixed on a probe and an observation plane comprises: a photon pressure laser applying irradiation pressure to a probe; a feedback control means for keeping the probe position motionless by applying irradiation pressure to the probe with the photon pressure laser through feedback control of probe position changes caused by movement of the particle fixed on the probe; and a laser output power recording means for measuring and recording the laser output power varying with time during said feedback control.

The probe may have an almost plate-like shape and be positioned in the axis perpendicular to the observation plane. An objective lens may be installed before the probe in the light path of the photon pressure laser. The apparatus may further comprise an interferometric image generation means for projecting an interferometric image on a split photodiode, a probe position detection means for detecting the probe position based on the interferometric image, and a laser intensity control means for controlling, based on said detection result, the intensity of the photon pressure laser irradiated onto the probe. The feedback control means may hold the root-mean-square of probe fluctuations at approximately 1.2 nm or less. The probe may have a predetermined spring constant and further comprise an offset function of keeping the probe in a state of dynamic balance.

This configuration allows measurement of the particle moving along the same axis as laser irradiation. The offset force may be determined as desired. However, in the case of measurement of protein movement, the offset force should be in the 8–25 pN range, sufficiently greater than the force resulting from the protein movement.

BRIEF DESCRIPTION OF THE DRAWINGS

Other objects and features of the invention are made clearer in the following detailed description when read in conjunction with the accompanying drawings, wherein.

Figure captions are as follows. 1: Beam expander, 2: First position-detecting reflector, 3: First objective lens, 4: Probe, 5: Second objective lens, 6: Split photodiode, 7: Interferometric image, 8: I-V converter, 9: Differential amplifier, 10: Position-detecting amplifier, 11. Feedback circuit, 12: A-D converter, 13: Computer, 14: Laser diode driver, 15: Photon pressure laser diode, 16: Photon pressure laser lens,17: Photon pressure laser reflector, 18: Laser irradiation, 19: Laser reflection, 20: Probe end, 21: Observation plane, 22: Slide glass, 23: Motor protein (microparticle), 24: Protein filament (microparticle), 25: Second position-detecting reflector.

DESCRIPTION OF THE PREFERRED EMBODIMENTS

Now the preferred embodiments of the invention will be described with reference to the accompanying drawings.

A micro particle such as a protein molecule is fixed on the probe end. The particle can be fixed on the probe end by methods such as plating the probe end with gold and modifying the protein with an SH-base for coupling, plating the probe end with nickel and fusing an His tag into the protein for coupling, and utilizing the interaction between avidin and biotin for coupling. The other end of the probe is connected to a predetermined apparatus.

Although the embodiment employs a plate-like glass probe with ZnO-whisker as a probe end, the probe is not limited to this particular embodiment. In contrast to the conventional method, the plate-like probe is installed upright against the observation plane in the present invention. The observation plane, which is usually a slide glass or the like, is the space wherein the micro particle fixed on the probe moves. Thus, the particle fixed on the probe moves in an axis parallel to the observation plane, maintaining a predetermined distance from the observation plane.

Ideally, the probe surface on which laser applies pressure should be coated with gold to raise its reflectivity and thereby apply photon pressure to the probe efficiently. Glass probes may be used that have a spring constant of approximately 0.1 pN/nm and are equipped with a probe end.

The displacement of the probe is measured as follows.

Figure 10:
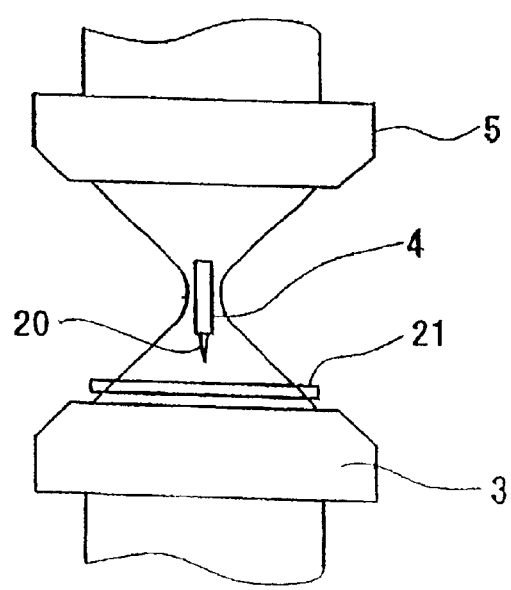
FIG. 10 is a diagram illustrating the probe position-detecting laser irradiating the probe.

Laser light is irradiated onto the observation plane via an objective lens to focus (or cross) on the probe, and the interferometric pattern resulting from probe displacement is projected onto a split photodiode for pattern analysis (see FIG. 10). A YAG laser with a wavelength of 532 nm may be used as the laser source.

The interferometric pattern changes with each movement of the probe. Because this change is proportional to the displacement of the probe, the position of the probe is quantitatively estimated from the interferometric pattern.

The probe is feedback-controlled to be apparently motionless, by monitoring its movement and applying photon pressure using a laser in the opposite direction to cancel any movement.

Then the force acting on the probe can be determined, in an indirect manner, by measuring the laser output power varying with time during feedback control. The laser that provides photon pressure should be directed upon the plate-like probe at an oblique angle. To prevent the optical system from being complex, the laser should be directed upon the surface of the plate-like probe through an objective lens.

The probe must be kept motionless during measurement, for which purpose the probe is monitored and controlled by an analog circuit. As described above, the position of the probe is detected by directing laser light upon the probe via an objective lens, and the resulting interferometric pattern is projected onto the split photodiode, while monitoring the output of an amplifier for position detection. During laser irradiation, the probe is subject to fluctuations caused by movements of the particle fixed on the probe and background thermal noise. Such fluctuations are damped by the following technique: the position signal is entered into a feedback circuit to follow the target signal. The probe fluctuations, converted into root-mean-square displacement, are reduced to a few nm or less to keep the probe motionless.

Analyzing the detected probe position, feedback signal, spring constant of the probe, and other factors makes it possible to measure the force acting on the probe, or the interactive force exerted between the micro particle fixed on the probe and micro particles fixed on the observation plane.

Figure 11:
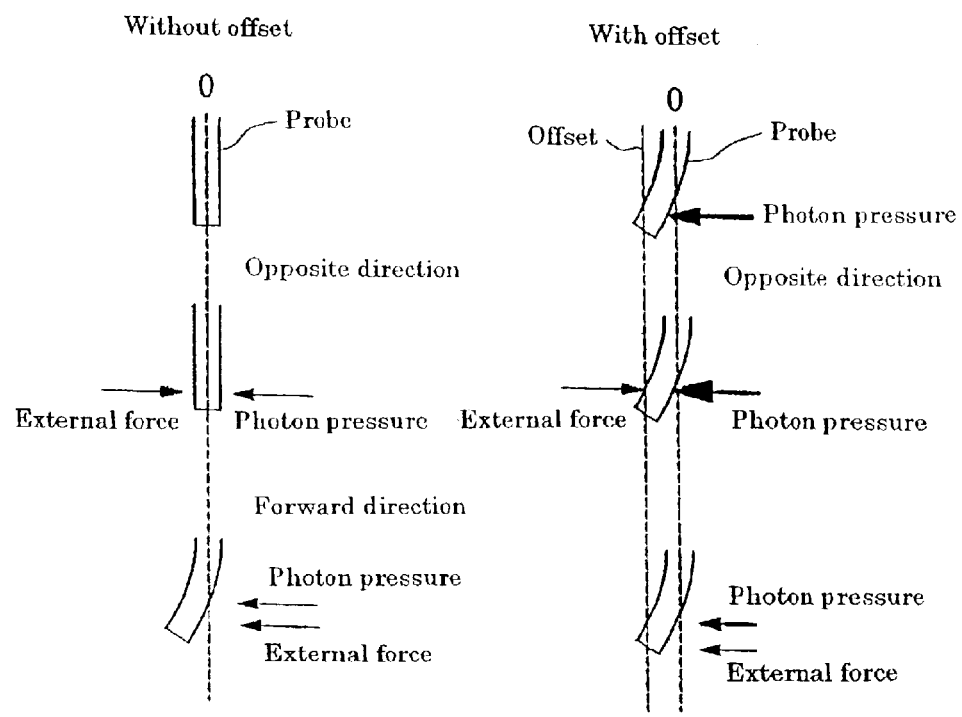
FIG. 11 is a diagram showing the difference arising from the presence/absence of a probe offset.

Another method is already available for measuring the physical force resulting from the movement of a particle fixed on a probe, based on the feedback signal of laser irradiation power. This method can measure the movement of the particle if the particle moves in an expected direction, namely, in the direction along the same axis but opposite to laser irradiation. However, movement along the same axis as the laser irradiation cannot be measured by this method. According to the present invention, an offset having the magnitude of a predetermined force exerted against laser irradiation is applied to the probe so that the probe may be motionless under a state of dynamic balance. This predetermined force for the offset is sufficiently greater than the force exerted by the particle fixed on the probe (see FIG. 11).

When the particle fixed on the probe moves in the direction along the same axis but opposite to laser irradiation, the offset force and the force associated with the particle movement are combined, and the irradiated laser is to have the intensity required to cancel the combined force.

On the other hand, when the particle fixed on the probe moves along the same axis as the laser irradiation, the offset force is attenuated by a force equal to the force associated with movement of the particle, and the irradiated laser is to have the intensity required to cancel out this force. In this way, in whatever direction the particle fixed on the probe may move, its movement can be detected by virtue of the offset.

EMBODIMENT

Figure 1:
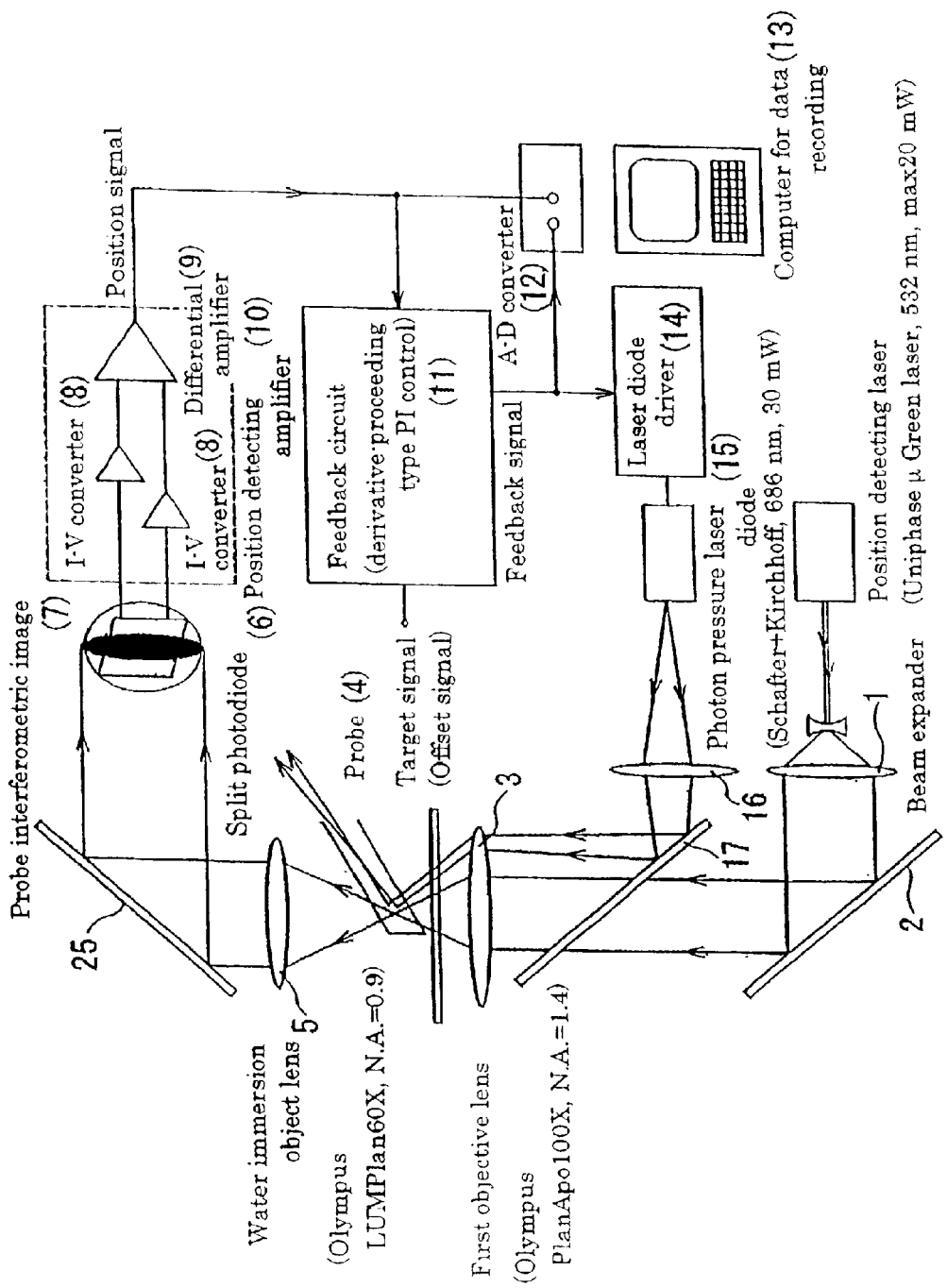
FIG. 1 is a schematic diagram giving an overview of the invented microforce measurement system.

FIG. 1 is a diagram giving an overview of the microforce measurement apparatus, which is an embodiment of the present invention. The measurement laser beam emitted from the position-detecting laser source (Uniphase μ Green laser, 532 nm, max. 20 mW) is expanded by a beam expander (1) and reflected by a first position-detecting reflector (2). The laser beam then enters a first objective lens (PlanApo 100X, N.A.=1.4)(3) for focusing and detects the position of the probe (4). For simplicity of system configuration, the first objective lens is set to pass both the position-detecting laser and photon pressure laser. The position-detecting laser must be controlled to avoid any effects upon the probe (4).

The position-detecting laser that has passed the probe (4) enters a second objective lens (5)(Olympus LUMPlan60X, N.A.=0.9). The position-detecting laser that has passed the second objective lens (5) is reflected by a second reflector (25) for the position-detecting laser. Because the laser beam is guided to the plate-like probe (4) by the flexible, easily-handled optical system, a plurality of light sources of different wavelengths can be selectively and easily connected.

Figure 8:
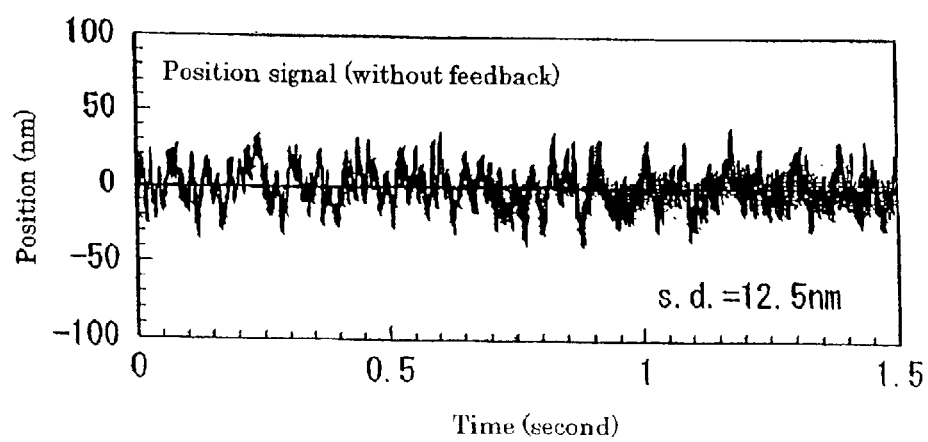
FIG. 8 is an experimental data graph indicating time-varying displacement caused by thermal fluctuations in the probe during the absence of feedback.
Figure 9:
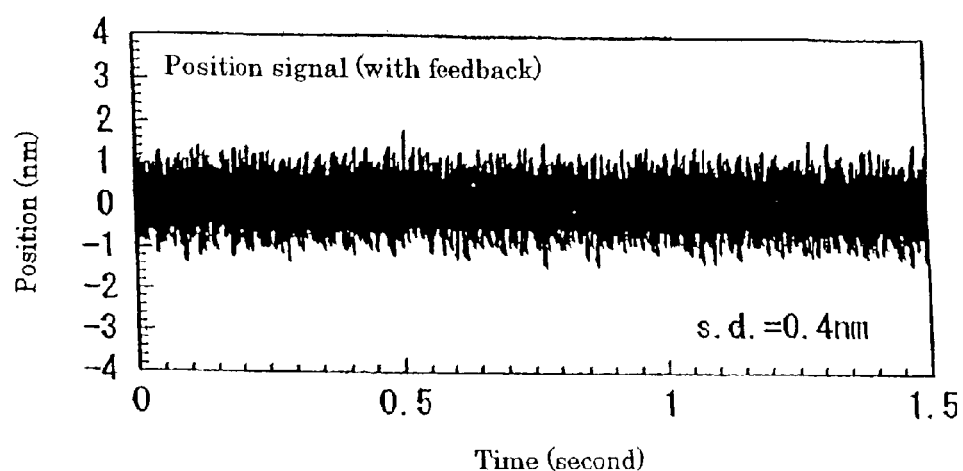
FIG. 9 is an experimental data graph indicating the time-varying displacement caused by thermal fluctuations in the probe when feedback is present.

Corresponding to the position of the probe (4), the probe position-measuring laser produces a probe interferometric image (7) in a split photodiode (6)(Hamamatsu Photonics S2545). The noise caused by thermal fluctuations in the probe (4) appears in the form of movements of the interferometric image (FIG. 8 and FIG. 9). This interferometric image (7) is converted into electric signals corresponding to the probe position by a position-detecting amplifier (10) incorporating I-V converters (8) and a differential amplifier (9). Part of this position signal is converted into a feedback signal by a feedback circuit (11)(derivative-proceeding type PI control).

The position signal is converted by an A-D converter (12) and recorded by a data recording computer (13). The computer (13) converts the background noise caused by thermal fluctuations and other sources into root-mean-square displacement.

The position signal is converted into a feedback signal by the feedback circuit (11) and sent to a laser diode driver (14). The laser diode (15) for providing photon pressure (Schafter+Kirchhoff, 686 nm, 25 mW) in the laser driver (14) emits the photon pressure laser the intensity of which is controlled by the feedback signal. The photon pressure laser that has passed through a lens (16) for the photon pressure laser is reflected by a reflector (17) for the photon pressure laser. The photon pressure laser that has passed the first objective lens (3) is irradiated onto the probe (4) at an oblique angle.

This feedback control system reduces thermal fluctuations in the probe (4) to a few angstroms in root-mean-square displacement, and the probe (4) is kept motionless.

FIG. 8 shows the displacement of the probe (4) in the absence of feedback, while FIG. 9 shows the displacement of the probe (4) affected by thermal fluctuations in the presence of feedback. Feedback control limits displacement of the probe (4) to the ±1 nm range.

The laser used to exert photon pressure is operated as follows.

Figure 2:
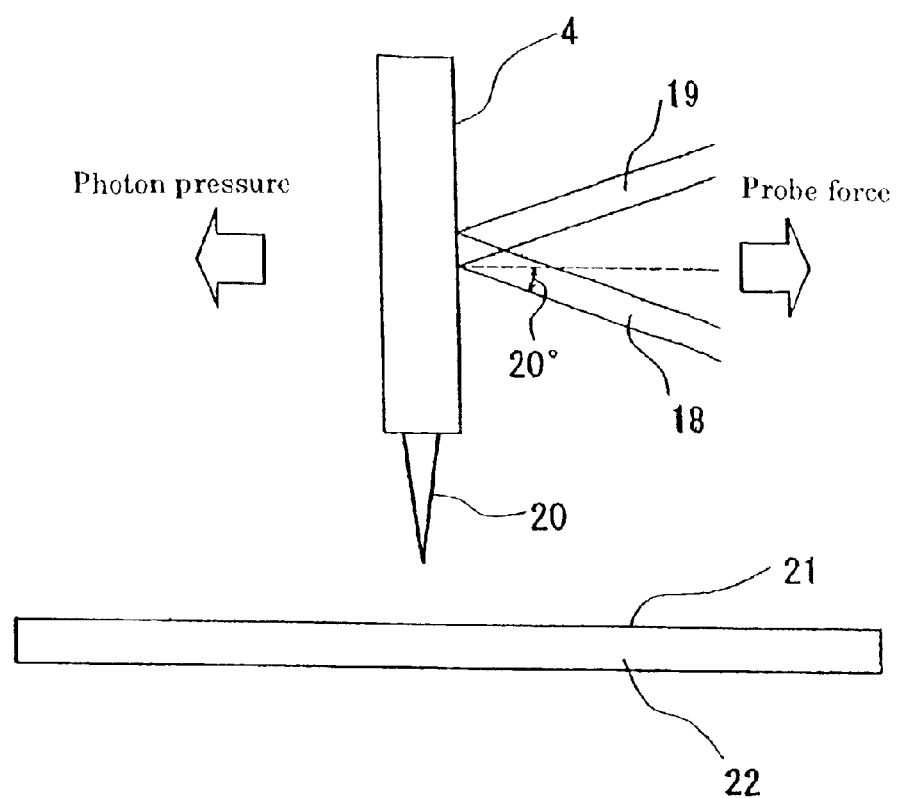
FIG. 2 is a diagram that illustrates the photon pressure laser irradiating the probe.
Figure 3:
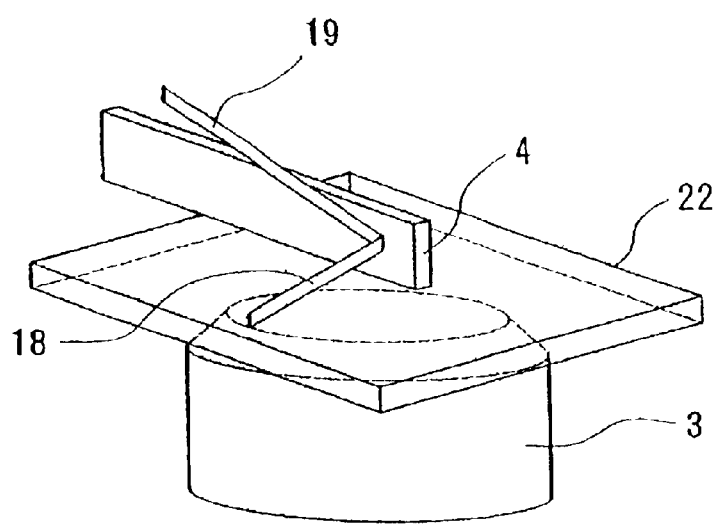
FIG. 3 is a diagram that illustrates the photon pressure laser irradiating the probe via a first objective lens and observation plane.

FIGS. 2 and 3 illustrate how the photon pressure laser is irradiated onto the probe. In the present embodiment, the laser diode emits laser light with a wavelength of 686 nm at maximum power of 25 mW. The photon pressure laser is irradiated through the first objective lens onto an approximately 20 $\mu$m-diameter region of the probe (4) at an incident angle of 20 degrees.

Figure 4:
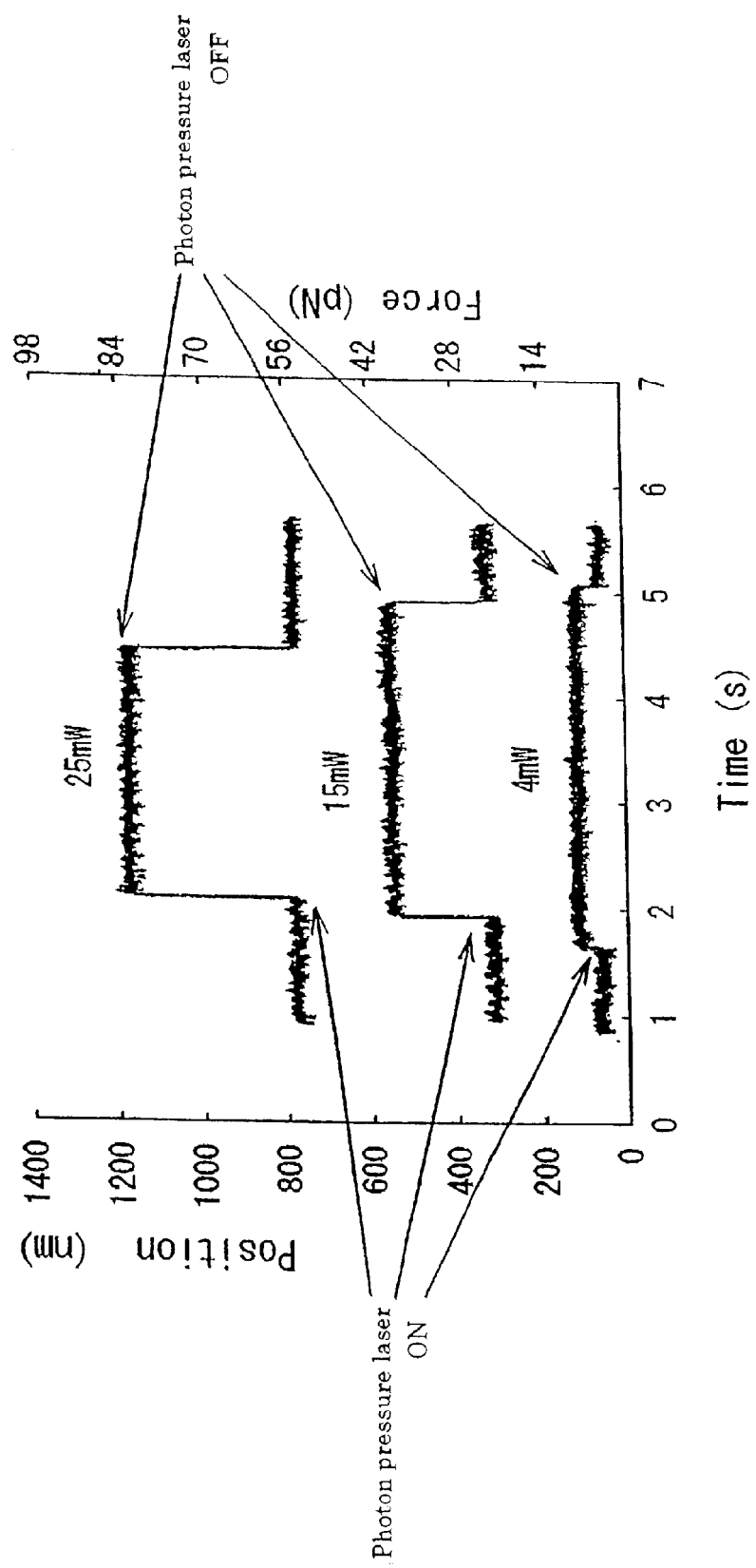
FIG. 4 is an experimental data graph indicating that it is possible to either fix or change the probe position by changing the intensity of the photon pressure laser.
Figure 5:
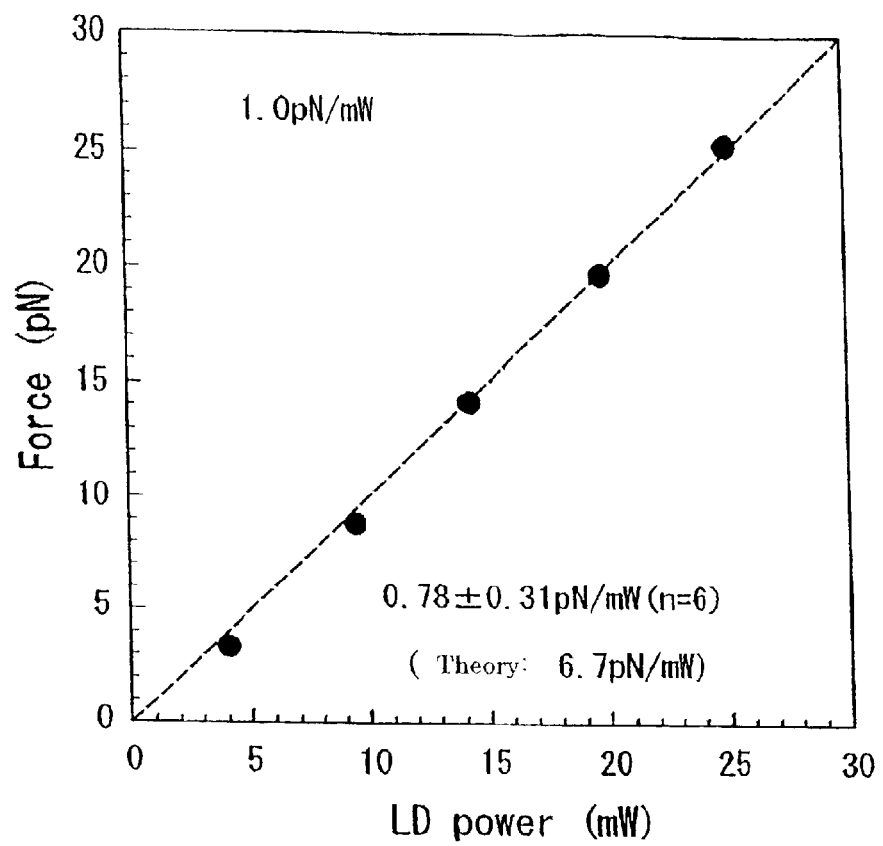
FIG. 5 is an experimental data graph indicating that the irradiation pressure applied to the probe changes in proportion to the intensity of the photon pressure laser.

The laser irradiation (18) applies irradiation pressure to the probe (4) in the direction indicated by the arrow. FIG. 4 shows the quantitative changes in probe position when the photon pressure laser is turned on and off. This figure clearly indicates that the probe position can be controlled by turning the photon pressure laser on and off, with excellent reproducibility. This figure also indicates that the probe position changes with the intensity of the photon pressure laser. FIG. 5 shows the relationship between the intensity of the photon pressure laser and the force acting on the probe (4). This force is proportional to the laser power.

The photon pressure laser has the functions of damping thermal fluctuations in the probe (4) and providing an offset for the probe (4). The offset signal of desired intensity is reserved in the feedback circuit (11) in advance.

Figure 6:
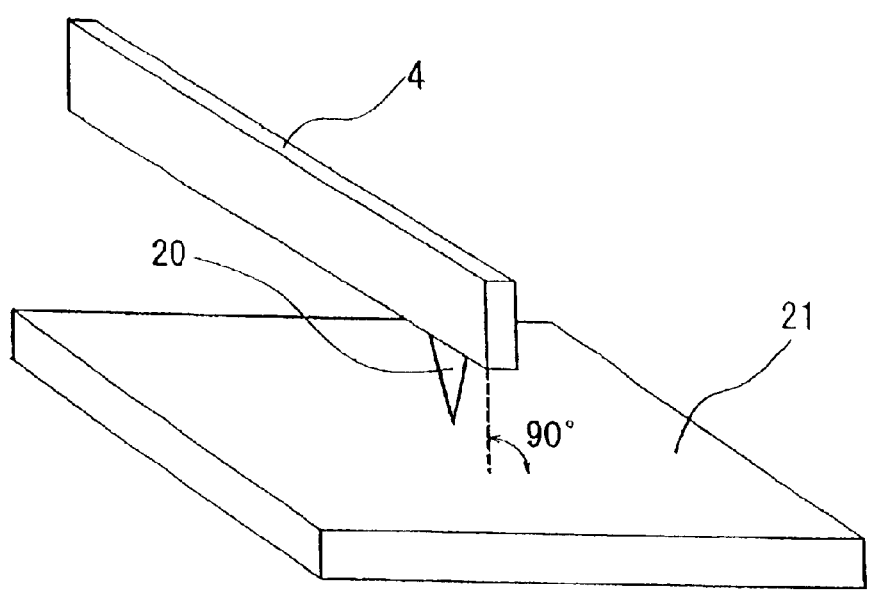
FIG. 6 is a diagram showing the position of the probe end over the observation plane.

The probe (4) is a glass probe of 200 $\mu$m in length, 20 $\mu$m in width, and 100 nm in thickness; the probe is coated with gold to a thickness of 5 nm and has a spring constant of 0.1 pN/nm. As shown in FIG. 6, the probe end (20) is made of a ZnO whisker, for example. As shown in FIGS. 2 and 3, the probe (4) is placed to stand perpendicular to the observation plane (21).

Figure 7:
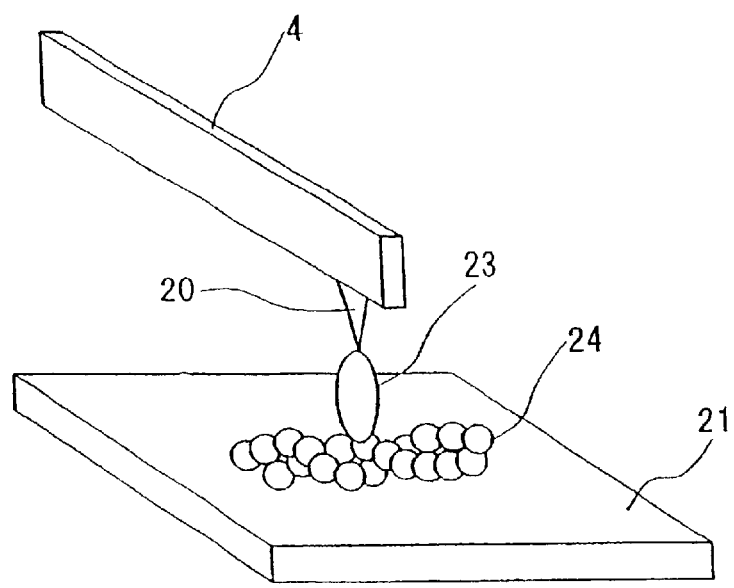
FIG. 7 is a diagram illustrating measurement of the interaction between proteins, in which a motor protein is fixed on the probe and protein filaments are fixed on the observation plane.

FIG. 7 shows an application of the present invention. A micro particle (23) is fixed to the end (20) of the probe (4), which is rendered motionless by feedback control. This micro particle is brought close to micro particle (24) fixed on a slide glass (22).

Then, 0.1 pN-order forces acting between the micro particle (23) and other micro particles (24) in the axis normal to the observation plane can be detected as changes in the feedback signal. For example, if a motor protein is fixed on the end (20) of the probe (4) and protein filaments are fixed on the slide glass (22), the time-varying change of 0.1 pN-order forces interacting between the motor protein and the protein filaments in the axis normal to the slide glass can be detected in the form of time-varying changes in the feedback signal while the position of the probe is fixed.

INDUSTRIAL APPLICABILITY

Because thermal fluctuations in the probe, converted to root-mean-square displacement, are reduced to a few angstroms, 0.1 pN-order forces can be detected by controlling to the distance between a micro particle fixed on the probe, such as a cell or molecule, and micro particles such as cells or molecules fixed on the observation plane within a few nm. The offset function of the photon pressure laser enables measurement of force in whichever direction the particle fixed on the probe may move. In addition, because the position-detecting laser is irradiated onto the probe and the displacement of its interferometric image is sent to the feedback circuit, photon pressure can be applied to the probe almost in synchronization with probe fluctuations.

What is claimed is:

1. A microforce measurement method for measuring microforces acting between a micro particle fixed on a probe and an observation plane, comprising the steps of:

keeping the probe position motionless by applying irradiation pressure to the probe with a photon pressure laser through feedback control of probe position changes caused by movement of the particle fixed on the probe; and measuring and recording the laser output power varying with time during said feedback control.

2. A microforce measurement apparatus for measuring microforces acting between a micro particle fixed on a probe and an observation plane, comprising:

a photon pressure laser applying irradiation pressure to a probe;

a feedback control means for keeping the probe position motionless by applying irradiation pressure to the probe with the photon pressure laser through feedback control of probe position changes caused by movement of the particle fixed on the probe; and a laser output power recording means for measuring and recording the laser output power varying with time during said feedback control.

3. The microforce measurement apparatus according to claim 2, wherein said probe has an almost plate-like shape and is positioned in the axis perpendicular to the observation plane.

4. The microforce measurement apparatus according to claim 2 or 3, wherein an objective lens is installed before the probe in the light path of the photon pressure laser.

5. The microforce measurement apparatus according to claim 2, further comprising:
   an interferometric image generation means for projecting an interferometric image on a split photodiode;
   a probe position detection means for detecting the probe position based on the interferometric image; and
   a laser intensity control means for controlling, based on said detection result, the intensity of the photon pressure laser irradiated onto the probe.

6. The microforce measurement apparatus according to claim 2, wherein said feedback control means holds the root-mean-square of probe fluctuations at approximately 1.2 nm or less.

7. The microforce measurement apparatus according to claim 2, wherein said probe has a predetermined spring constant and further comprises an offset function of keeping the probe in a state of dynamic balance.

* * * * *